United States Patent [19]
Tucker

[11] 3,926,835
[45] Dec. 16, 1975

[54] INFRARED TRANSMITTING FILTER CONTAINING 1,4,5,8-TETRACYCLOHEXYLAMINOAN-THRAQUINONE

[75] Inventor: Robert Jerome Tucker, Hackettstown, N.J.

[73] Assignee: American Cyanamid Company, Stamford, Conn.

[22] Filed: June 8, 1973

[21] Appl. No.: 368,385

Related U.S. Application Data
[63] Continuation-in-part of Ser. No. 120,237, March 2, 1971.

[52] U.S. Cl.................................. 252/300; 350/1
[51] Int. Cl.² ......................................... G02B 5/22
[58] Field of Search......... 252/300; 350/1; 260/378, 260/41

[56] References Cited
UNITED STATES PATENTS
| | | |
|---|---|---|
| 2,495,500 | 1/1950 | Amon, Jr. et al.............. 252/300 X |
| 2,611,772 | 9/1952 | Allen et al. ......................... 260/378 |

*Primary Examiner*—Benjamin R. Padgett
*Assistant Examiner*—R. E. Schafer
*Attorney, Agent, or Firm*—John L. Sullivan

[57] ABSTRACT

Optical filters comprised of a plastic film having incorporated therein a mixture of dyes including the compound 1,4,5,8-tetracyclohexylaminoanthraquinone are substantially opaque to visible radiation but permit high transmission of wavelengths in the near infrared region.

2 Claims, 1 Drawing Figure

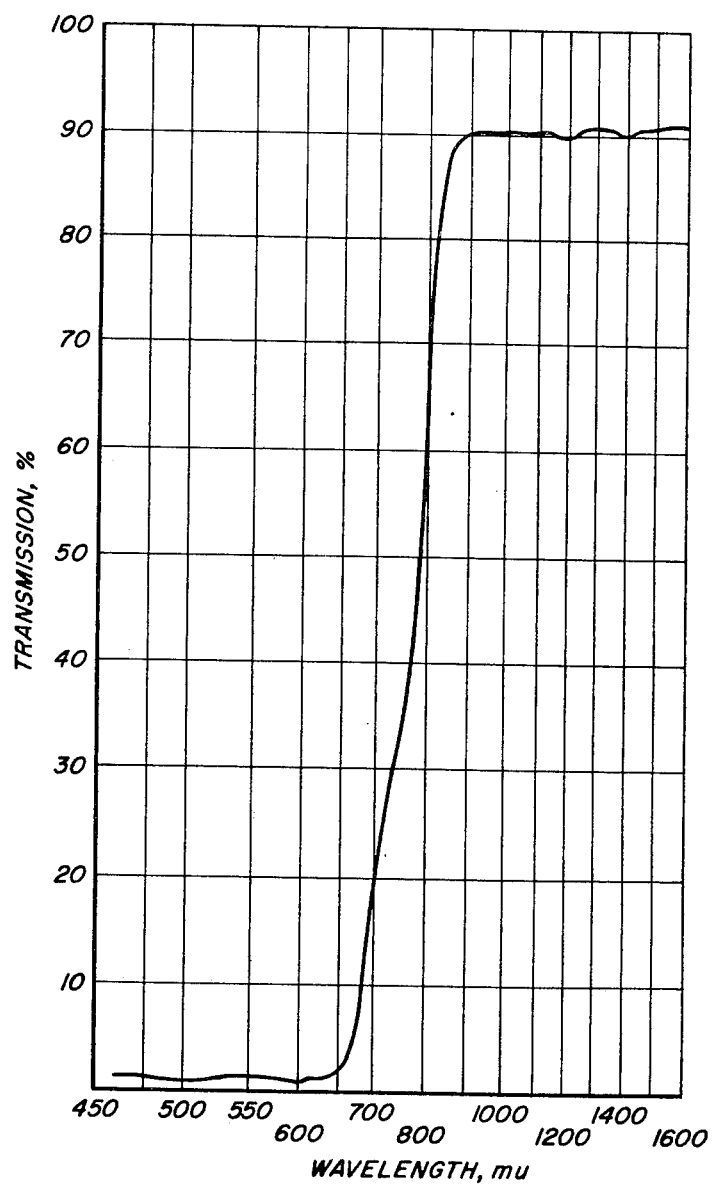

INFRARED TRANSMITTING FILTER CONTAINING 1,4,5,8-TETRACYCLOHEXYLAMINOAN-THRAQUINONE

This application is a continuation-in-part of application Ser. No. 120,237, filed Mar. 2, 1971.

This invention relates to band pass filters which are substantially opaque to visible radiation and which provide high transmission of wavelengths in the near infrared region. More particularly, this invention relates to filters which are polymeric films containing organic dyes which render the dyed polymeric film opaque to visible light at wavelengths below about 700 mu and which permit a high transmission of light in the near infrared at wavelengths of from just above 700 mu to about 1200 mu.

Infrared-transmitting optical filters are known. Thus, Schneeberger, U.S. Pat. No. 3,279,938, discloses a polypropylene film support having deposited on one surface thereon a porous smoke deposit layer of antimony triselenide approximately 40 microns thick. The optical properties are essentially similar to those of the filters described herein. Also, Brode et al., U.S. Pat. No. 2,579,543, show a filter obtained by coating a glass support with a resin mixture containing various organic dyes. These filters absorb wavelengths below 780 mu and transmit wavelengths in the near infrared above 780 mu.

The disadvantages of Schneeberger's filters lie in the complexity of the process for their manufacture and the high cost of the antimony triselenide. The process requires the deposition of a layer of antimony triselenide vapor of up to 40 microns in thickness onto the surface of a polypropylene support. Moreover, it requires the use of an inert carrier gas, such as helium, in an evacuated system. Deposits thicker than 40 microns tend to break away from the substrate; thicker deposits require the smoking of two surfaces of the polypropylene.

The Brode et al filters, on the other hand, need a glass support for the resin mixture used to provide the optical characteristics disclosed therein. Moreover, these filters absorb 80 mu into the near infrared region of interest. For uses in which the infrared source is strong this is probably not too important. However, for uses with weak infrared sources, the filters require a sharp rise in transmission at the beginning of a near infrared region, remaining high throughout the region. There is a need, therefore, for a filter which is self-supporting, stable, durable, easily handled, easily manufactured and inexpensive. It is the object of this invention to provide such a filter.

It is a further object to provide such a filter having a maximum transmission of about 2% in the region up to about 700 mu and a transmission of at least about 50% and generally 85–90% in the region of from about 700 mu to about 1200 mu.

Shepherd et al., U.S. Pat. No. 2,418,605 disclose cellulose films which are dyed to provide filters having no transmission of light below about 800 millimicrons and a high transmission above 800 millimicrons. The cellulose filters are made by dyeing with one or the other of two vat dyes in combination with a suitable red dye to absorb all of the shorter wavelengths of visible light which may be transmitted by the other dye. Such filters are limited to cellulose or regenerated cellulose, both of which are vat dyeable. Moreover, the filters absorb light in the region 700 millimicrons to 800 millimicrons, which is the range of detection of the most readily available detection systems. Thus, the Shepherd filters fail to meet the needs of available light detection systems. Still another disadvantage of these prior art filters is that they are cumbersome to make.

In accordance with the present invention, it has now been discovered that a filter having the said optical properties can be made from a polymeric film material having incorporated therein a mixture of organic dyes, including an effective amount of the compound 1,4,5,8-tetracyclohexylaminoanthraquinone. This compound permits a sharp cut-off in absorption at 700 mu in the plastic material, while the other organic dyes present provide absorption of substantially all visable light up to about 650 mu.

The compound 1,4,5,8-tetracyclohexylaminoanthraquinone, which is represented by the formula:

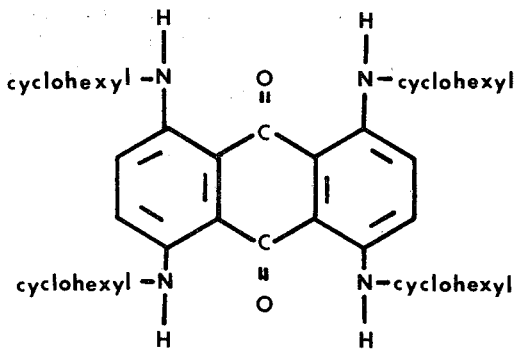

may be prepared as shown in Example 4 of U.S. Pat. No. 2,611,772.

The filters of the invention are made by incorporating the appropriate organic dyes along with the 1,4,5,8-tetracyclohexylaminoanthraquinone into a polymeric material in amounts such as to provide the desired optical properties in the resulting polymeric film, as more fully described hereinbelow.

The polymeric substrate used in the preparation of the films of this invention is not critical so long as it meets the requirements of the resulting filter, i.e., is self-supporting, durable, stable, easily manufactured, etc. and does not possess optical properties which would interfere with those of the filter. A particularly suitable polymer is a copolymer of vinyl chloride and about 3% vinyl acetate, sold commercially by Union Carbide under the trade name VYNW-5. Other suitable polymers include polymethylmethacrylate, polyvinylacetate and the cellulosic esters.

The incorporation of one or more organic dyes into the plastic material along with the 1,4,5,8-tetracyclohexylaminoanthraquinone to absorb the remaining visible light is a relatively simple matter, and does not comprise a critical feature of the invention. Organic dyes which are suitable for this use and which, alone or in combination, may be used to absorb light in the visible region include: CI Acid Green 25 (Color Index 61570), CI Disperse Red 9 (Color Index 60505), CI Solvent Violet 13 (Color Index 60725), CI Solvent Yellow 14 (Color Index 12055) and Direct Dye (Color Index 28705). The particular dyes used are not critical;

similar dyes sold commercially under a variety of trade names may be used as effectively. The amount of the dyes used will vary with the particular dyes selected but, of course, should be sufficient to result in a film having no more than about 2% transmission in the visible region.

The 1,4,5,8-tetracyclohexylaminoanthraquinone, however, and the amount thereof incorporated in the film is critical to the obtainment of the desired high transmission of radiation in the near-infrared region. Thus, the concentration (weight %) of this compound times the thickness of the film (in mils) must equal a constant falling within the range of from 0.25 to 3.25 corresponding to a degree of opacity in the visible region of from 98% to 100%.

The invention is illustrated by the following example.

EXAMPLE 1

To a suitable vessel was charged 10 grams of VYNW-5 (a copolymer of 97% vinyl chloride and 3% vinyl acetate) and tetrahydrofuran (solvent) to a total volume of 100 ml. The mixture was then stirred until all the polymer dissolved. To this solution the following dyes and plasticizer (dioctyl phthalate) were added in the amounts shown with stirring to complete solution:

| | | |
|---|---|---|
| Dioctyl phthalate | 2.0 | grams |
| C.I. Acid Green 25 | 0.0375 | '' |
| C.I. Disperse Red 9 | 0.0328 | '' |
| C.I. Solvent Violet 13 | 0.0244 | '' |
| C.I. Solvent Yellow 14 | 0.0132 | '' |
| Direct Dye, C.I. 28705 | 0.0105 | '' |
| 1,4,5,8-tetracyclohexyl-aminoanthraquinone | 0.0100 | '' |

A portion of the resulting solution was then poured onto a glass plate and drawn down into a film with a draw down bar. The dired film was 3.9 mils thick and was dark violet. The transmittance curve for the film is shown in the accompanying drawing. As will be seen from the transmittance curve, the film is substantially opaque to visible light, but exhibits a sharp rise in transmittance in the region of 650–700 mu and high transmittance in the near infrared region, i.e., from 700 mu to 1200 mu.

I claim:

1. An optical filter which is substantially opaque to radiation in the visible region but which permits high transmission in the near infrared region comprising a plastic film having incorporated therein a mixture of organic dyes which provide absorption of substantially all visible light up to about 650 mu and the compound 1,4,5,8-tetracyclohexylaminoanthraquinone, the weight percent concentration of said compound in said film being such that said concentration multiplied by the thickness of the film equals a constant falling within the range of from 0.25 to 3.5 corresponding to a degree of opacity in the visible region of from 98% to 100%.

2. An optical filter as in claim 1 wherein the plastic film is a copolymer of about 97% vinyl chloride and about 3% vinyl acetate.

\* \* \* \* \*